Patented July 12, 1938

2,123,191

UNITED STATES PATENT OFFICE 2,123,191

INSECTICIDE AND METHOD OF MAKING SAME

John F. Les Veaux, Middleport, N. Y., assignor to Niagara Sprayer and Chemical Co., Inc., Middleport, N. Y., a corporation No Drawing. Application June 4, 1936, Serial No. 83,555

5 Claims. (Cl. 167—15)

This invention relates to arsenical insecticides and more particularly to insecticides containing insoluble arsenates of substantially non-toxic metals such as calcium and magnesium.

The present application for Letters Patent is a continuation in part of my co-pending application S. N. 14,529.

The invention has among its principal objects the provision of an arsenical insecticide of the class specified which is substantially free from phytocidal substances, i. e. substances which are injurious to an objectionable degree to living plant organisms such as apple trees, peach trees and other trees or plants which are injured by these phytocidal substances when materials containing them are applied to these plants in the usual manner for controlling the insect pests thereon, as for instance in the manner and in accordance with the usual practice in applying lead arsenate to such plants.

It is well known that lead arsenate is substantially non-injurious to sensitive plants such as those mentioned above but the lead contained in this material is objectionable because of its toxic character which is cumulative in the human organism when the residues normally left on the fruits or other edible portions of the plant (except when washed by special methods) are taken into the human system as food. In recent years very low tolerances limiting the amount of lead upon fruits, vegetables, etc., have been promulgated by authorized government officials both Federal and State, for this reason, so that it is highly desirable that an arsenical insecticide be provided which is substantially free from lead or other similar toxic metal and yet which is substantially as effective as lead arsenate for use as an insecticide on fruits and other edible portions of plants generally of the class which ordinarily require the use of arsenical insecticides in order to efficiently control certain insect pests to which they are normally subject.

Furthermore, it is well known that the lead in the lead arsenate residues normally remaining on the fruits, etc., is frequently difficult to remove even by special washing methods referred to above so that it is equally desirable that an arsenical insecticide be provided, the normal residues of which can be more readily and conveniently removed from the fruits, etc., than is possible with lead arsenate.

I am aware that ordinary commercial calcium arsenate and magnesium arsenate have been proposed as substitutes for lead arsenate in order to avoid the toxic effects of lead and the lead residue problem referred to above, but these substitutes for lead arsenate have proved far from satisfactory mainly for the reason that they have been found to be injurious to the trees or plants to a very objectionable degree. I am also aware that various so-called safening agents have been proposed, to be added to the calcium arsenate or magnesium arsenate to render them less injurious to the trees or plants but these procedures likewise have not overcome the difficulties mentioned above to any satisfactory extent, if at all, or else the resulting materials have not possessed the necessary insecticidal value or toxicity toward the insect pests.

The present invention effectively meets the requirements outlined above and also completely or at least very largely overcomes the objections just mentioned in connection with prior attempts to meet these requirements, by providing an insecticide containing an arsenate of a non-toxic metal, preferably an arsenate of calcium, which is substantially free from phytocidal substances, is substantially non-injurious to trees, fruits and plants, is highly toxic toward insect pests and which possesses a resistance toward the decomposing action of carbon dioxide solution or carbonic acid substantially greater than that of the substantially insoluble reaction product obtained by bringing lime or other soluble calcium compounds into intimate contact with arsenic acid or a soluble arsenate and water at ordinary or elevated temperatures and separating the insoluble reaction product from the water.

In carrying out my invention I prefer to proceed as follows:

I first prepare a starting material consisting of so-called commercial calcium arsenate by adding approximately 75 percent arsenic acid to a suspension of hydrated lime in water containing about 12 percent hydrated lime, adjusting the relative proportions of arsenic acid and hydrated lime so as to produce a product containing not less than about 40 percent of arsenic expressed as $As_2O_5$ and consisting mainly of tribasic calcium arsenate, the formula of which is $Ca_3(AsO_4)_2$ and usually about 26 percent by weight of hydrated lime, all in accordance with procedures well known in this art.

The dried product thus obtained (so-called ordinary commercial calcium arsenate) is next screened, if necessary, to obtain a granular material, the particles of which range in size from about $1/100$ of an inch to about $1/4$ of an inch in diameter. This granular material is now heated uniformly to a temperature of about 1700 to 2000 degrees Fahrenheit for about one half hour to two hours, preferably for about an hour in a rotary type furnace such as is commonly used in decarbonating or calcining limestone to produce quicklime, using a non-reducing mixture of combustion gases from an oil or gas burner and air to supply the heat by direct transfer to the material to be heated. In heating the material the main consideration is that every particle be exposed to the hot gases in order to facilitate the flow of heat throughout the charge and to permit the heat to penetrate each particle, the object being to raise the temperature of substantially all of the particles in the mass to the temperature specified and to maintain this temperature for the specified period of time. The lining of the kiln is also provided with rows of fire brick projecting toward the axis of the kiln to promote the tumbling or stirring of the material during its passage through the furnace. The heat treated material produced in this way is next cooled in any convenient manner as by passing it through a second unheated rotating kiln or tube and then pulverized to any desired degree of fineness depending upon the use to which it is to be put, and is then ready for use in applying to plants as a dust, or, when suspended in water as a spray.

In operating the furnace it should be tilted at such an angle and rotated at such a speed as to allow about one half to two hours time for the passage of the material from the charging end of the furnace to the discharging end. Before introducing any material into the furnace the oil or gas torches are first lighted and the hot combustion gases therefrom mixed in any convenient manner with an incoming stream of air, the relative volumes of the combustion gases and the air being regulated so as to produce a mixture of gases containing an excess of oxygen and the temperature of the combustion gases being such as to raise the temperature of the mixed gases to about 2000 degrees Fahrenheit before they enter the furnace. If necessary the mixed gases may be cooled to this temperature by passing them through a cooling box or chamber before they enter the furnace proper. The hot gases are permitted to pass through the furnace until the furnace itself is slowly heated to such a temperature that the gases emerging from the upper end thereof acquire a temperature of about 1700 degrees Fahrenheit after which the temperature of the incoming gas mixture is regulated in any convenient manner so as to hold the temperature of the exit gases at the lower end of the furnace at about this same temperature, i. e., 1700 degrees Fahrenheit.

It is highly important to avoid a strongly reducing atmosphere of mixed hot gases in the furnace such as are commonly present in annealing furnaces, iron melting reverberatory furnaces, etc., although a neutral atmosphere is not harmful. To be safe and to allow for variations in firing, however, it is advisable to keep the flame strongly oxidizing by introducing air or other oxidizing gas. Also, since the gases from a neutral flame, or in other words, combustion gases which are neither reducing nor oxidizing ordinarily give a temperature which is too high for this purpose, the temperature of the mixed gases should preferably be regulated by regulating the supply of the excess air.

After the furnace and hot gases have reached equilibrium at the temperatures and under the conditions specified above and such that the exit gases are at a temperature of about 1700 degrees Fahrenheit, the granular calcium arsenate is fed into the upper end of the furnace continuously in such a manner that the material passes through the furnace at a reasonably constant rate.

As stated above, the hot heat-treated material is next cooled by passing it through a second rotary kiln or rotating cooling tube and as it is discharged from the latter it is conveyed on a continuous type conveyor to a grinding or pulverizing mill of any convenient type and there ground to the desired degree of fineness after which it is passed on to a second continuous conveyor and carried to a supply hopper from which it is drawn off directly into paper bags and packed therein for the market. In this manner the necessity for using air tight metal drums for packing the hot material is avoided.

Extensive field tests of the product produced in accordance with the foregoing specific example show that it is substantially free from phytocidal substances and yet at the same time possesses an insecticidal value or toxicity toward insect pests, which is substantially equal to that of acid lead arsenate under many conditions when applied to the plants to be treated at the rate of about one pound in place of each pound of lead arsenate ordinarily used in accordance with well-known practices. These field tests have also shown that the product of the above example is substantially as safe or non-injurious to the plants as the lead arsenate or at least approximates the safety of lead arsenate more nearly than any other insoluble arsenate heretofore produced.

It will be understood, however, that my invention is not restricted to the specific product and method set forth in the example of my invention described above but that numerous changes may be made in both the method and products as set forth in the appended claims. Thus, for instance, I may substitute magnesium arsenate as the starting material in place of the commercial calcium arsenate specified in the example with a resulting improvement in the safety of the magnesium arsenate when applied to plants. Likewise, I may substitute other forms of calcium arsenate as the starting material for the so-called commercial calcium arsenate which is ordinarily prepared in accordance with the method described above although I prefer the last mentioned product and method of making same for the reasons among others that I thus obtain a starting material of very uniform composition and a better finished final product and also avoid the interfering action of certain impurities commonly present in other forms of calcium arsenate resulting from other methods of manufacture, particularly when the so-called double decomposition method of making calcium arsenate is employed or when the calcium arsenate is produced by reacting upon lime with sodium arsenate. Some of the starting materials and methods of making same which may be substituted as a starting material for the commercial calcium arsenate and the method of making the same specified above are described in the following U. S. Patents: 1,447,938 (Ellis & Stewart); 1,507,690 (Simpson); 1,667,490 (Piver); 1,667,491 (Piver); 1,505,648 (Lamb); 1,626,942 (Liipfert), and similar methods and products of the prior art.

Also my invention is not restricted to the use of granular commercial calcium arsenate of the particular size specified in the example, but I may use the raw material in a finely pulverized state with good results. When this is done the safening action resulting from the heat treatment takes place more rapidly than with granular material and for this reason the time during which the material is maintained at the specified temperature should be reduced accordingly, the treatment being discontinued when the calcium arsenate acquires the desired degree of safety or freedom from phytocidal impurities and before it becomes substantially inert or substantially non-toxic toward insect pests. The point at which this treatment should be discontinued may be determined by field tests of samples of the calcium arsenate or by testing its resistance toward the decomposing action of carbon dioxide solution or carbonic acid in accordance with a laboratory test or procedure to be described further on.

Likewise I may vary the temperature to which the material is heated since I have found that a substantial safening of the product begins to take place at temperatures as low as 1100 degrees Fahrenheit, although a longer time is required to produce such a safening effect at these lower temperatures than when the higher temperatures specified in the example are employed. At temperatures below about 1100 degrees Fahrenheit the safening action is not satisfactory even with prolonged heating. I may also use temperatures running up to about 2200 degrees Fahrenheit with good results under which conditions the safening action takes place more rapidly than it does under the conditions specified in the example and accordingly the time of treatment is shortened until the product acquires the desired properties of safety and toxicity as determined by field tests or by the carbonic acid test referred to above which will now be described in more detail.

In determining the point at which the heating of the calcium arsenate should be discontinued in order to obtain a product having a satisfactory safety toward plants or at which it becomes substantially free from phytocidal substances and yet at the same time possesses the required degree of toxicity toward insect pests I test its resistance toward the decomposing action of carbon dioxide solution or carbonic acid and discontinue the heating when this resistance reaches a certain value or comes within a certain range of values as determined by the following carbonation test:—

Carbonated water is made by bubbling carbon dioxide through distilled water in a series of 5 or 6 flasks kept in a cold water bath for 24 hours or less. The flasks are emptied into one large bottle and agitated to make a uniform solution and the concentration of carbon dioxide is determined in the following manner:

Pipette 50 cc. of approximately $N/10 Ba(OH)_2$ (made by dissolving 16 grams $Ba(OH)_2.8H_2O$ in one liter distilled water) into each of two beakers. Pipette 50 cc. of the carbonated water into one of the beakers. Add three drops phenolpthalein to each beaker and titrate both beakers with standard $N/10 HCl$ to the point where the pink color of the solution disappears.

The difference in the titrations is equivalent to the concentration of $CO_2$. The concentration is usually from .8 to 1.6 g. $CO_2$/liter.

The carbonation test itself is made as follows:

Five bottles of about 800 cc. capacity are used. To the first is added 650 cc. distilled water, to the second 550 cc., to the third, 450 cc., etc. To each bottle is then added 1.5 grams of the calcium arsenate in question. Then to number one is added 100 cc. of the carbonated water, to number two is added 200 cc. etc., giving a series containing 1.5 grams calcium arsenate in various concentrations of carbon dioxide.

The five bottles are tightly stoppered and put in a tumbling machine running about 50 R. P. M. and thus turned alternately bottoms up and down for 30 minutes to insure exposure of all particles of the sample to the carbonic acid. The temperature during this procedure is held at about 65 degrees Fahrenheit.

The solutions are then filtered and 500 cc. of the filtrate treated with 3 cc. of concentrated sulphuric acid and boiled down in a liter Erlenmeyer flask to about 100 cc. volume, three grams of potassium iodide are added and the evaporation continued to 50 cc. volume.

The cooled solution is made to 300 cc. with distilled water, titrated to colorless point with $N/10$ sodium thio sulphate solution, neutralized with bicarbonate adding 5 grams in excess, a few drops of starch solution added and titrated with $N/20$ iodine.

It is observed that the above carbonation method is substantially the same as the method for determining water soluble arsenic in calcium arsenate described in the book entitled "Official and Tentative Methods of Analysis of the Association of Official Agricultural Chemists" second edition, published by the said association, pages 50 and 51. From the data obtained in this manner the amount of soluble arsenic in each bottle is calculated and expressed as metallic arsenic.

When ordinary commercial (wet-precipitated) calcium arsenate, prepared by the first step described in the specific example of my invention given above, is tested in the manner just described, the results on the average are approximately as given in the following table:

Table I

| Grams $CO_2$/750 cc. | Percent soluble arsenic |
|---|---|
| 0.171 | 4.64 |
| 0.342 | 7.49 |
| 0.513 | 10.73 |
| 0.684 | 12.94 |
| 0.855 | 14.51 |

These results also approximate those obtained with calcium arsenate prepared in accordance with the prior art as described in the U. S. patents hereinbefore mentioned.

In the practice of my invention, I continue the heat treatment of the calcium arsenate mixture as described above until a representative sample weighing about 1.5 grams when subjected to the carbonation test described above reacts with the carbon dioxide to form an amount of soluble arsenic which is substantially less than that shown in Table I above for each of the amounts of carbon dioxide per 750 cc. shown in the table and particularly for the higher amounts of carbon dioxide, but I prefer to continue the heat treatment of the calcium arsenate, in the case where the pulverized material being treated contains about 26 percent excess lime over and above that corresponding to normal calcium arsenate, until a representative sample of the product thus obtained, weighing about 1.5 grams, when brought into intimate contact with about ¼ gram of carbon dioxide dissolved in about 750 cc. of water at a temperature of about 65 degrees Fahrenheit for about 30 minutes with stirring reacts with the carbon dioxide and water to form an amount of soluble arsenic, expressed as metallic arsenic, not more than about 2 percent of the weight of the sample.

When I calcine or heat-treat material containing more or less than about 26 percent excess lime, in accordance with the method of this invention, I prefer to continue the heat-treatment under any given set of conditions until a sample of the product thus produced, weighing about 1.5 grams, when brought into intimate contact with an amount of carbon dioxide dissolved in 750 cc. of water which is substantially equivalent to the excess lime, at a temperature of about 65° F., for about 30 minutes, with stirring, reacts with the carbon dioxide solution to form an amount of soluble arsenic, expressed as metallic arsenic, which is not more than about 2 percent of the weight of the sample.

I have also found that when the resistance of the heat-treated or calcined calcium arsenate, toward the decomposing action of carbonic acid is such that the amount of soluble arsenic formed from 1.5 grams of the material as determined by the above test when 2 grams of $CO_2$ per 750 cc. of water is used in place of the equivalent amount of $CO_2$ mentioned above, is less than about ½ percent, the resulting product does not possess a satisfactory toxicity toward insect pests such as those commonly controlled by means of lead arsenate or magnesium arsenate, etc.

It will be observed that the 2 grams of $CO_2$ referred to above is considerably in excess of that amount which is substantially equivalent to the excess lime contained in the 1.5 grams sample of the material, the purpose of using this excess of $CO_2$ being to subject the material to a more vigorous carbonation action in order to determine the point at which the material becomes substantially inert or non-toxic for controlling insect pests by the methods commonly used for this purpose.

On the other hand I have found that when the resistance of the calcined or heat-treated calcium arsenate (containing excess lime) toward the decomposing action of carbonic acid is such that the amount of soluble arsenic formed as determined by the above test (using an amount of carbonic acid substantially equivalent to the excess lime) is more than about 2 percent, the resulting product is objectionably injurious to the plants, or, in other words, is not substantially free from phytocidal substances.

It will be understood, however, that, in general, advantageous results are obtained if the heating or calcining of the calcium arsenate or magnesium arsenate or other similar insoluble arsenates of non-toxic divalent metals (whether containing excess base or not) is continued until their safety toward plants is substantially increased provided the heating is discontinued before the material becomes inert or substantially non-toxic toward insect pests, and it will be understood that this general procedure and method constitutes an important aspect or feature of my invention.

After the calcium arsenate is calcined or heated in accordance with my invention as described above I have found it advantageous to hydrate the calcined material, after cooling, in any convenient manner, preferably by feeding granular or powdered material into a current of steam and separating the powdered material from the steam after the excess calcined lime contained in the material has been hydrated to calcium hydrate. This method of hydration may conveniently be carried out by means of the so-called steam mill or steam pulverizer in which the current of heated steam carrying the suspended granular material impinges against the hard metal surface in such manner that the suspended granular material is further pulverized or broken up into a powder and emerges from the mill in a substantially dry state. It is advantageous also to mix a small amount of a deflocculating agent such as casein with the calcined calcium arsenate before carrying out this hydration step to prevent agglomeration of the particles. It will be understood, however, that this rehydration and fine grinding operation may be carried out in any convenient manner which will result in the hydration of the quicklime or calcium oxide formed during the calcination step of my process and the breaking up of the agglomerated particles.

The main advantage of this hydration and deflocculating operation is that it further increases the toxicity of the calcined calcium arsenate and also improves the physical properties of the finished product.

It will also be understood that my invention is not limited or restricted to the particular type of calcining furnace described in the specific example described above, but that any other suitable or convenient type of calcining furnace may be used such as a shelf type calcining furnace or Herreschoff type of furnace and the like.

The remarkable resistance of the improved calcium arsenate of the present invention toward the action of carbon dioxide is well illustrated by the data shown in Table II below. This data was obtained by testing a sample of well safened calcium arsenate which had been calcined or heat-treated in accordance with the present invention by the carbonation test hereinbefore described.

*Table II*

| Grams $CO_2$/750 cc. | Percent soluble arsenic |
|---|---|
| 0.171 | .08 |
| .342 | .22 |
| .513 | .45 |
| .684 | 1.18 |
| .855 | 1.96 |

It will be observed that if the different percentages of soluble arsenic shown in Table II be plotted on the ordinate axis against the corresponding grams of carbon dioxide on the abcissa axis on cross section paper and a smooth curve drawn through the different points thus obtained in the usual manner of plotting a curve to represent graphically the variation of one variable quantity with another on which its value depends, the curve thus obtained is convex to the abcissa at all points and I have discovered that this relationship between the different percentages of soluble arsenic and the different corresponding amounts of carbon dioxide used in the above described carbonation test is characteristic of calcium arsenate which has been safened or freed from phytocidal substances by the heat treatment of the substantially dry arsenical material in accordance with my invention, whereas in the case of calcium arsenate which has not been thus heat-treated, the carbonation curve plotted in the manner described above is convex to the abcissa only from the foot of the curve to the ordinate which corresponds to the amount of carbon dioxide (usually about ¼ gram) which is substantially equivalent to the excess of calcium oxide (usually about 26 percent) in the 1.5 gram sample of the calcium arsenate material, the remainder of the curve from this point on being concave to the abcissa, the entire curve resembling a crude letter S.

On the other hand if the calcium arsenate material is heat-treated in the dry state to an excessive degree so that the product becomes substantially inert or non-toxic to insect pests as previously explained then the carbonation curve described above is only very slightly or imperceptibly convex to the abcissa.

In connection with the above discussion of the different forms of carbonation curves it will be obvious that those portions of such curves which are convex toward the abcissa correspond to a continuous increase in the percentage of soluble arsenic produced by each constant or unit increment in the amount of carbon dioxide (i. e. the slope of this convex portion of the curve increases continuously) and that those portions of the curves which are concave toward the abcissa correspond to a continuous decrease in the percentage of soluble arsenic produced by each constant or unit increment in the amount of carbon dioxide (i. e. the slope of this concave portion of the curve decreases continuously).

It will thus be observed that my improved arsenical product is characterized in part at least by a definite relationship between the different amounts of soluble arsenic formed by the action of different amounts of carbon dioxide on the material throughout a very wide range of proportions of carbon dioxide to the arsenical product.

In making the carbonation test the particle size of the calcined or heat-treated material should correspond to 70% to 90% through a 300 mesh screen determined as follows: A ten gram sample is stirred into 200 cc. of water and poured onto a previously wetted screen. The screen is washed free of smaller than 300 mesh particles by a gentle stream from a tap, the residue flushed into a beaker, washed into a tared gooch, dried and weighed. If the particle size is larger than that specified above, the results of the carbonation test will be low and if smaller the results will be somewhat higher than normal.

I claim:

1. The method of reducing the injurious effect of calcium arsenate containing lime on living plant organisms which comprises preparing the said insecticide in a substantially dry granular state or condition and heating the said granular insecticide to a temperature between about 1100° F. and 2200° F. until a representative sample of the product thus obtained in a state of subdivision such that, after suspending in water, 70% to 90% passes through a 300 mesh wetted screen when gently washed, weighing about 1.5 grams, when brought into intimate contact with about ¼ gram of carbon dioxide dissolved in about 750 cc. of water at a temperature of about 65 degrees Fahrenheit for about 30 minutes with stirring reacts with the carbon dioxide and water to form an amount of soluble arsenic, expressed as metallic arsenic, not more than about 2 percent of the weight of the sample, and discontinuing the heating when a second sample weighing about 1.5 grams when brought into contact with about 2 grams of carbon dioxide dissolved in 750 cc. of water at a temperature of about 65° F. for about 30 minutes, with stirring reacts with the carbon dioxide solution to form an amount of soluble arsenic, expressed as metallic arsenic, which is not less than about ½ percent of the weight of the sample.

2. A composition of matter comprising an arsenate of calcium characterized by a degree of resistance toward the decomposing action of carbon dioxide solution such that when a number of representative samples of the arsenate of calcium, weighing about 1.5 grams each, are brought separately into intimate contact each with a different solution of carbon dioxide, the concentration of the several different solutions of carbon dioxide ranging from about 0.171 gram of carbon dioxide per 750 cc. to a maximum of about 2 grams of carbon dioxide per 750 cc., the temperature of said solutions being about 65° F. and the time of contact between the samples and the solution being about 30 minutes, the several samples of calcium arsenate react separately with the several carbon dioxide solutions to form amounts of soluble arsenic, expressed as metallic arsenic, which are successively greater for each unit increment of carbon dioxide as between the several different solutions of carbon dioxide.

3. The method of reducing the injurious effect of a calcium arsenate containing uncombined or excess lime on living plant organisms which comprises preparing the said calcium arsenate in a substantially dry granular state or condition and heating the said granular material to a temperature between about 1100° F. and 2200° F. until a representative sample of the product thus obtained, weighing about 1.5 grams in a state of subdivision such that, after suspending in water, 70% to 90% passes through a 300 mesh wetted screen when gently washed, when brought into intimate contact with carbon dioxide, in an amount substantially equivalent to the uncombined or excess lime, dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and discontinuing the heating when a second sample weighing about 1.5 grams when brought into contact with about 2 grams of carbon dioxide dissolved in 750 cc. of water at a temperature of about 65° F. for about 30 minutes, with stirring reacts with the carbon dioxide solution to form an amount of soluble arsenic, expressed as metallic arsenic, which is not less than about ½ percent of the weight of the sample.

4. A composition of matter comprising an arsenate of calcium containing uncombined or excess lime characterized by a degree of resistance toward the decomposing action of carbon dioxide solution such that when a representative sample, weighing about 1.5 grams, of the said arsenate of calcium in a state of subdivision such that after suspending in water, 70% to 90% passes through a 300 mesh wetted screen when gently washed, is brought into intimate contact with carbon dioxide, in an amount substantially equivalent to the uncombined or excess lime, dissolved in about 750 cc. of water at a temperature of about 65° F. for about 30 minutes with stirring reacts with the carbon dioxide and water to form an amount of soluble arsenic, expressed as metallic arsenic, not more than about 2% of the weight of the sample, and discontinuing the heating when a second sample weighing about 1.5 grams when brought into contact with about 2 grams of carbon dioxide dissolved in 750 cc. of water at a temperature of about 65° F. for about 30 minutes, with stirring reacts with the carbon dioxide solution to form an amount of soluble arsenic, expressed as metallic arsenic, which is not less than about ½% of the weight of the sample.

5. A composition of matter comprising an arsenate of calcium characterized by a degree of resistance toward the decomposing action of carbon dioxide solution such that when a number of representative samples of the said arsenate of calcium, weighing about 1.5 grams each, in a state of subdivision such that, after suspending in water, 70% to 90% passes through a 300 mesh wetted screen when gently washed, are brought separately into intimate contact each with a different solution of carbon dioxide, the concentration of the several different solutions of carbon dioxide ranging from about 0.171 gram of carbon dioxide per 750 cc. to a maximum of about 2 grams of carbon dioxide per 750 cc., the temperature of said solutions being about 65° F. and the time of contact between the samples and the solution being about 30 minutes, the several samples of calcium arsenate react separately with the several carbon dioxide solutions to form amounts of soluble arsenic, expressed as metallic arsenic, which are successively greater for each unit increment of carbon dioxide as between the several different solutions of carbon dioxide.

JOHN F. LES VEAUX.